United States Patent [19]
Renner

[11] Patent Number: 6,121,691
[45] Date of Patent: Sep. 19, 2000

[54] POWER REDUCTION CIRCUIT FOR ENGINE ACCELERATION

[75] Inventor: Ross Renner, Black Creek, Wis.

[73] Assignee: Illinois Tool Works Inc., Glenview, Ill.

[21] Appl. No.: 09/261,481

[22] Filed: Feb. 26, 1999

[51] Int. Cl.[7] .................................................. B23K 9/095
[52] U.S. Cl. ........................... 290/40 A; 322/29; 219/133
[58] Field of Search ................................ 290/40 R, 40 A, 290/40 C; 322/27, 29; 219/133, 130.33

[56] References Cited

U.S. PATENT DOCUMENTS

| | | | |
|---|---|---|---|
| 3,513,325 | 5/1970 | Tharp | 290/40 |
| 3,715,005 | 2/1973 | Byram et al. | 180/103 |
| 4,629,968 | 12/1986 | Butts et al. | 322/29 |
| 4,868,480 | 9/1989 | Van Der Linde | 322/7 |
| 5,035,220 | 7/1991 | Uchinami et al. | 123/436 |
| 5,172,665 | 12/1992 | Kuroda | 123/339 |
| 5,670,070 | 9/1997 | Clark et al. | 219/130.33 |
| 5,708,254 | 1/1998 | Ikegami et al. | 219/133 |
| 5,734,147 | 3/1998 | Bunker et al. | 219/130.33 |
| 5,734,562 | 3/1998 | Redl | 363/16 |
| 5,968,385 | 10/1999 | Beeson et al. | 219/130.33 |
| 6,005,220 | 12/1999 | Bunker et al. | 219/130.33 |
| 6,040,556 | 3/2000 | Shinya et al. | 219/133 |

*Primary Examiner*—Nick Ponomarenko
*Attorney, Agent, or Firm*—George R. Corrigan

[57] ABSTRACT

A method and apparatus for providing welding power from an engine/generator driven welding power supply includes an engine and a generator. A welding power supply is connected to the generator output, and provides welding power. A controller controls the apparatus, and receives an RPM input signal indicative of the engine RPM, and a user selected magnitude input. The controller includes an output reduction circuit that reduces the magnitude of the welding power by a variable amount in the event the engine is likely to stall, so as to reduce the likelihood of a stall, but maintain sufficient power for a welding arc. The magnitude of the welding power is reduced by an amount responsive to the engine speed in the event that the engine RPM is less than an RPM threshold, and/or by an amount responsive to the user selectable setting in the event that the user selectable setting is greater than a threshold. The power reduction may be responsive and/or proportional to the difference between the actual value and the threshold, and continuous or done in steps. The output reduction circuit controls the generator field current or the load current command to reduce the welding power.

49 Claims, 5 Drawing Sheets

POWER REDUCTION CIRCUIT FOR ENGINE ACCELERATION

FIELD OF THE INVENTION

The present invention relates generally to the art of welding power supplies. More specifically, it relates to engine driven welding power supplies having output control based on engine speed.

BACKGROUND OF THE INVENTION

Engine/generator driven welding power supplies typically include an engine, a generator, a welding power source, often a wire feeder, and one or more controllers. The components may be sold as a group, a single unit or individually.

The engine has a throttle which may have a range of speed selections and often has a control mechanism to allow operation at full throttle and idle. The generator output is often controlled using field current, and the welding power supply is controlled in response to a user set point or reference. The controller may be relatively complex, and control the components in a unified manner, or it may be individual controllers for each component, with little or no joint control of components.

Many controllers that treat the components as individual components rather than as part of a system may be inadequate. For example, a typical engine control (used outside of the welding art) might not be capable of responding to the very rapid increase in power needed when an arc is struck or the set point changed. Similarly, a welding power supply controller designed for utility power line voltage use might not adequately respond when the engine is slow to provide the needed power.

A controller for field current designed for a welding power supply is described in U.S. Pat. No. 5,734,147, entitled Method And Apparatus For Electronically Controlling The Output Of A Generator Driven Welding Power Supply, filed Sep. 8, 1995, and assigned to the assignee of the present invention. U.S. Pat. No. 5,734,147, is hereby incorporated by reference.

One problem with engine/generator driven welding power supplies that are not properly controlled is that it may be difficult to start the arc, especially in stick or MIG welding. Generally, a "hot" start or higher current/power start is desirable so the stick does not become welded to the workpiece. But before an arc is initiated or struck, an engine/generator driven welding power supply generator is idling. It cannot provide a hot or high current/power start because the horsepower (which is transformed into output power) available while idling is much less than the horsepower available at higher RPM.

Experienced welders have attempted to get a hot start by "double striking" or touching the stick to the workpiece before welding. This causes current to increase, and the engine to speed up out of idle, before the arc is struck. However, this caused marking of the workpiece that was unacceptable for some x-ray quality welds or welds requiring a high surface quality. Also, this may not be a satisfactory solution for heavy loads or for CV applications.

Accordingly, U.S. Pat. No. 5,734,147 teaches to provide a hot start by giving an additional boost of current when the arc is struck. Unfortunately, this sometimes caused the engine to stall, because the called for output power was greater than the horsepower available (after accounting for system inefficiencies which may be about 50%) at lower RPM.

An engine/generator driven welding power supply is likely to stall when more power is drawn than is capable of being provided. This is more likely to happen at lower RPM, because less horsepower is available at lower RPM than at higher RPM.

One attempted solution to that problem is to increase the engine speed at idle. This undesirably increases fuel consumption and reduces engine life. An alternative attempted solution is to increase the engine speed from idle to a higher speed. Another attempted solution is to temporarily reduce the output, until the likelihood of a stall is reduced. Both of these methods are suggested in application Ser. No. 08/858, 129, filed May 19, 1997, entitled Engine Driven Invertor With Feedback Control, which is owned by the assignee of this invention and is hereby incorporated by reference.

However, the response of engine speed to throttle changes is often not fast enough to prevent stalling, particularly if the load (output power) had been quickly increased when the engine is at a low speed. Also, reducing output power can cause additional problems—lower power can have an adverse impact on the arc. Thus, the competing interests of reducing power to avoid engine stalls while maintaining power to maintain a quality arc were necessarily properly balanced, particularly when the power reduction was merely on or off, and not variably controlled.

For example, the prior art does not teach to reduce the output by an amount responsive to operating conditions such as engine speed or output current, power, load, setpoint etc. In other words, it does not teach to have greater reduction in output power when the engine is slower, or the output is greater—the reduction is the same regardless of the severity of the stall conditions and the conditions of the arc.

The Miller™ BlueStar™ welding power supply tried to account for different severity of stall conditions by increasing the "throttle back" of output power as RPM decreased. This was done for all output currents even though at some output currents the load was not large enough to be likely to cause a stall. The reduction at lower currents often unduly reduced the quality of the arc. Thus, this system did not balance the need for power reduction to avoid a stall, and the need for power maintenance to help arc quality.

Accordingly, a controller for an engine/generator driven welder that reduces the output in response to potential stall conditions, and that does so at a magnitude responsive to the severity of the stall conditions and the arc condition is desirable.

SUMMARY OF THE PRESENT INVENTION

According to a first aspect of the invention an engine/generator driven welding power supply includes an engine, and a generator driven by the engine. A welding power supply is connected to the generator output, and provides welding power. A controller controls the apparatus, and receives an RPM input signal indicative of the engine RPM, and a user selected magnitude input. The controller includes an output reduction circuit that reduces the magnitude of the welding power by a variable amount in the event the engine is likely to stall, so as to reduce the likelihood of a stall, but maintains sufficient power for a welding arc.

According to a second aspect of the invention an engine/generator driven welding power supply includes a user selectable magnitude input, an engine, a generator, a welding power supply and a controller. A feedback circuit provides RPM feedback to the controller. The controller includes an output reduction circuit that reduces the magnitude of the welding power by an amount responsive to the engine speed in the event that the engine RPM is less than an RPM threshold and the user selectable magnitude input is greater than a threshold.

According to a third aspect of the invention an engine/ generator driven welding power supply includes a user selectable magnitude input, an engine, a generator, a welding power supply and a controller. The controller includes an output reduction circuit that reduces the magnitude of the welding power by an amount responsive to the user selectable setting in the event that the user selectable setting is greater than a threshold.

According to a fourth aspect of the invention a method of controlling an engine/generator driven welding power supply includes determining a user selected magnitude setting and providing a welding output responsive to the user selected magnitude setting. Also, the speed of the engine is determined and the magnitude of the welding output is reduced by a variable amount in the event the engine is likely to stall so as to reduce the likelihood of a stall, but maintain sufficient power for a welding arc.

According to a fifth aspect of the invention a method of controlling an engine/generator driven welding power supply includes determining a user selected magnitude setting and providing a welding output responsive to the user selected magnitude setting. Also, the speed of the engine is determined and the magnitude of the welding output is reduced by an amount responsive to the engine RPM in the event that the engine RPM is less than an RPM threshold, and that the user selected magnitude setting is greater than a threshold.

According to a sixth aspect of the invention a method of controlling an engine/generator driven welding power supply includes determining a user selected magnitude setting and providing a welding output responsive to the user selected magnitude setting. Also, the speed of the engine is determined and the magnitude of the welding output is reduced by an amount responsive to the user selected magnitude setting in the event that the engine user selected magnitude setting is greater than a threshold.

The output reduction circuit controls the generator field current to reduce the welding power in one embodiment, and it controls the load current command in another embodiment.

The output reduction circuit begins to act when the engine RPM is less than an RPM threshold in another embodiment, and the reduction is: dependent on the difference between the RPM threshold and the engine RPM, proportional to the difference between the RPM threshold and the engine RPM, or done in steps in various embodiments.

The output reduction circuit begins to act when the user selected magnitude setting is greater than a threshold, or responsive to the difference between the threshold and the user selected magnitude setting, or adjusted in steps in steps responsive to the difference between the threshold and the user selected magnitude setting, in various alternatives.

Other principal features and advantages of the invention will become apparent to those skilled in the art upon review of the following drawings, the detailed description and the appended claims.

Figure 1:
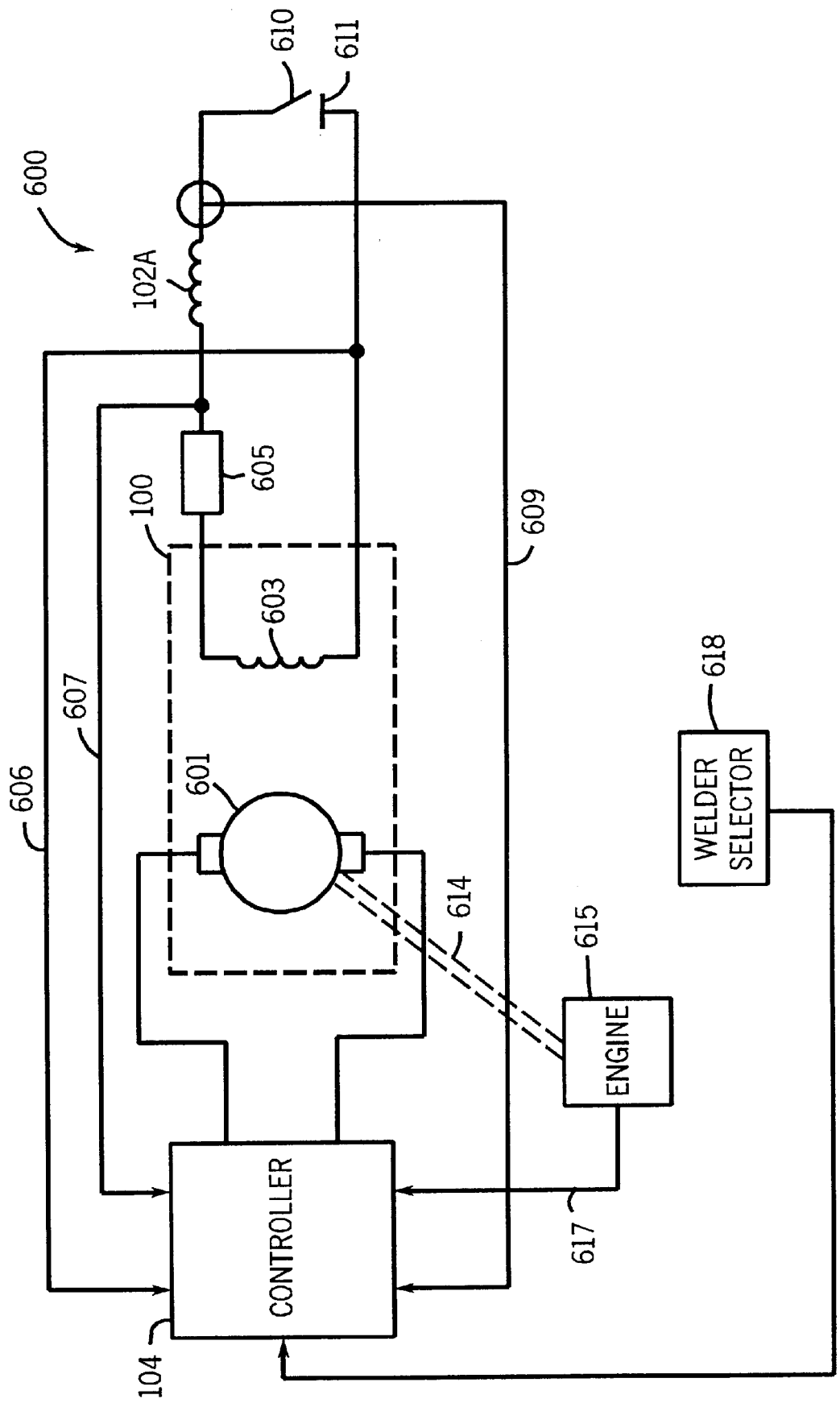
FIG. 1 is a schematic diagram of an engine/generator driven welding power constructed in accordance with the present invention.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to a particular controller, power supply, generator and engine, it should be understood at the outset that the invention can also be employed with other such components.

Generally, the invention includes reducing the output of an engine/generator driven welding power supply when the engine is likely to stall. The reduction is not merely on/off, but is greater for more severe or more likely stall conditions. Preferably, the reduction in output power is obtained by reducing the field current. The parameters monitored to prevent a stall (i.e. the stall conditions) are, preferably, engine RPM and the user selected output setpoint (typically obtained from a potentiometer on the from panel).

The reduction in power (or voltage and/or current) output is preferably such that it does not adversely affect the welding operation during the time the output is reduced. Also, while the engine speed is increasing, reducing the likelihood of an engine stall, the reduction in output is tapered down until the engine speed has increased sufficiently to avoid stalling, and full power is provided, in the preferred embodiment. This helps minimize the impact of this anti-stall feature on the welding arc.

The invention is implemented on a Miller™ Trailblazer™ engine/generator driven welding power supply such as that described in U.S. Pat. No. 5,734,147. The welding power supply described therein need not be described here in detail to understand the present invention, although FIG. 1, described below, is derived from that patent.

FIG. 1 is a schematic of an engine/generator driven welding power supply 600 constructed in accordance with the present invention, and includes a generator 100, an controller 104, an output rectifier 605, an output inductor or filter 102A, and feedback lines 606, 607 and 609. Power supply 600 provides current at a desired voltage to electrode 610 and workpiece 611. A user selectable or selected input 618, such as a rheostat on the power supply front panel, indicates the desired welding current (or power, voltage or other welding parameter) and provides a reference signal to controller 104.

Generator 100 includes a rotor 601 and a stator 603, and may be either a three phase or a single phase generator. Rotor 601 includes field windings that create the field from which power is derived by stator 603. An engine 615 is mechanically coupled (represented by dashed lines 614) to rotor 601.

The voltage and current derived by stator 603 is responsive to the magnitude of the field current provided to rotor 601. The output of stator 603 is provided to rectifier 605 and output inductor 102A which provides the welding output of power supply 600. The field current magnitude is responsive to electronic field current controller 104. Thus, electronic field current controller 104 indirectly controls the output of power supply 600.

Feedback from the welding output is provided on lines 606, 607 and 609. Voltage feedback is obtained from the output of rectifier 605, and is fed back to electronic field current controller 104 via lines 606 and 607. Current feedback is obtained by a current sense device and is fed back to electronic field current controller 104 via line 609. Electronic field current controller 104 uses the current and voltage feedback to control the field current in such a manner as to provide a desired output current and voltage. The basic control scheme in the preferred embodiment is that shown in U.S. Pat. No. 5,734,147, and controller 104 is an electronic field controller, although other control schemes and controllers (such as, for example, that shown in application Ser. No. 08/858,129), now U.S. Pat. No. 5,969,385 may be used.

The present invention includes a power (or load) reduction circuit that causes the output power to be reduced when a stall is likely. The output reduction circuit may be part of controller 104, part of another controller, or a separate circuit. It may be digital, analog, an IC, or discrete components. It may include the feedback circuitry and/or receive feedback signals from other circuitry.

Generally, the magnitude of the power reduction is variable (i.e., dependent on other factors such as the severity of the stall conditions), and not merely on or off. The reduction is sufficient to avoid stalling, yet small enough to avoid a negative impact on the arc. Preferably, engine RPM or speed is used to determine stall conditions and is monitored on a feedback line 617. RPM or speed may be directly determined from the engine using a tachometer, or in a conventional manner using a frequency to voltage converter with the generator output, or any other parameter which is indicative of the engine speed.

If the RPM falls below a threshold, the output is reduced, preferably by an amount responsive to the difference between the RPM and the threshold, i.e., a greater drop below the threshold results in a greater output reduction. The output is reduced by reducing the field current command in the preferred embodiment, although other commands, such as the voltage command, or the load current command in an inverter, are reduced in alternative embodiments.

The preferred embodiment provides a graduated reduction in output, responsive to engine speed. Above 3400 RPM there is no reduction in output. The reduction in output begins at an RPM of 3400, and the reduction increases linearly with RPM, until maximum reduction is reached at 2400 RPM (which is idle speed the engine).

The reduction is only implemented when the user selected magnitude control (rheostat setting) is at 50% or greater. From 50% to 70% rheostat setting the maximum reduction is 10%. In other words, if the rheostat setting is between 50% and 70% of maximum, then at 3400 or less RPM the output magnitude is reduced by R %=(3400−RPM)/100, where R % is the percent reduction, and RPM is the measured engine speed.

From 70% to 100% the maximum reduction is 40%. In other words, if the selected magnitude is between 70% and 100% of maximum, then at 3400 or less RPM the output magnitude is reduced by R %=(3400−RPM)/25, where R % is the percent reduction, and RPM is the measured engine speed.

Figure 2:
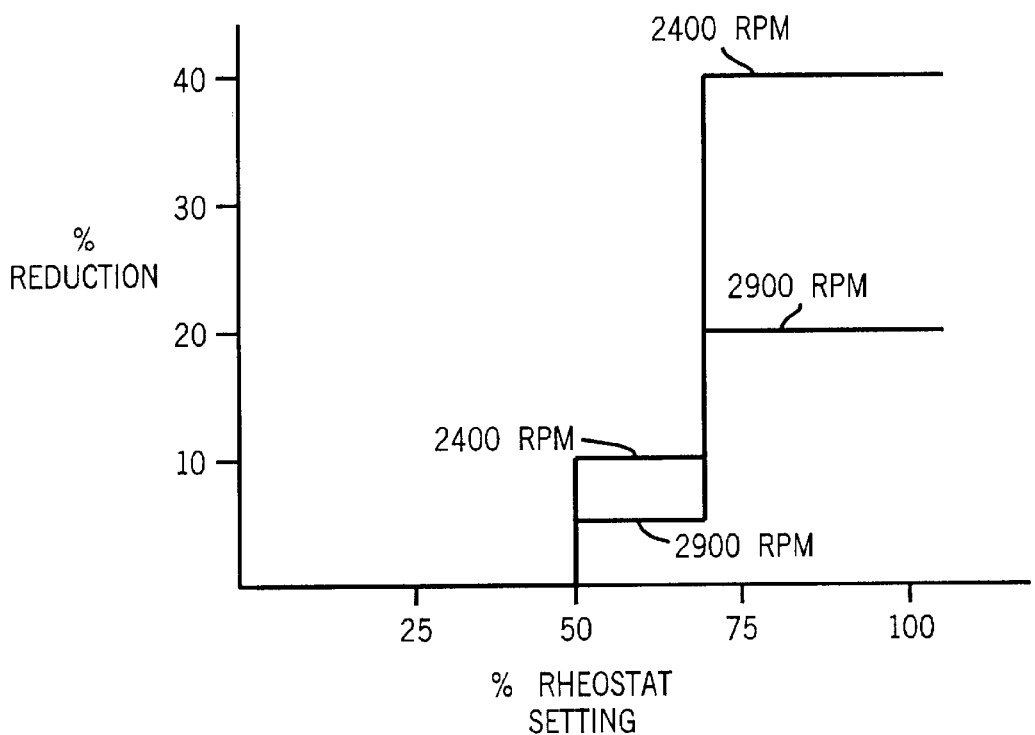
FIG. 2 is a graph showing percent power reduction vs rheostat setting.
Figure 3:
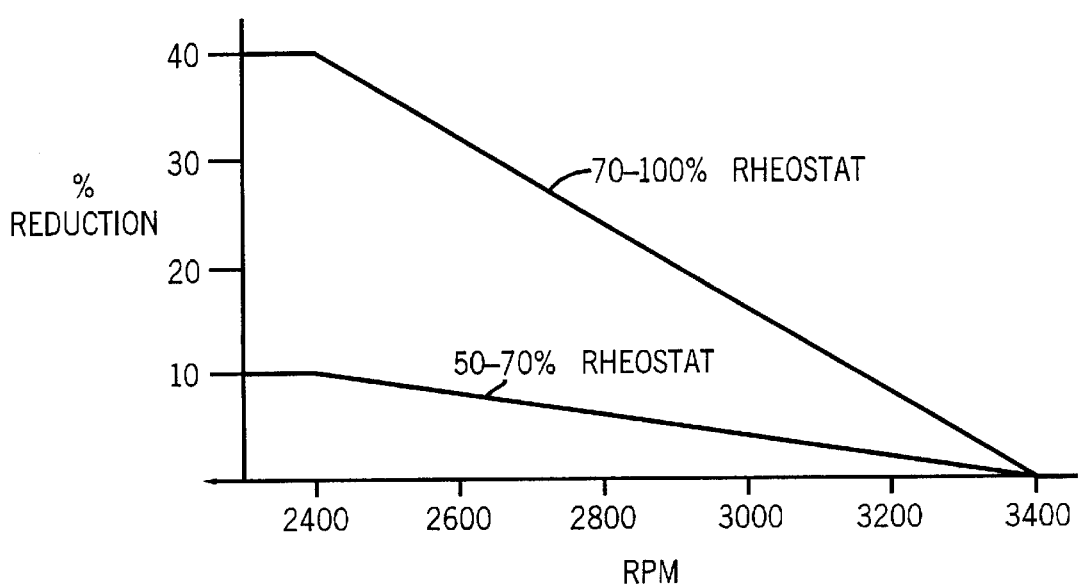
FIG. 3 is a graph showing percent power reduction vs RPM.

FIGS. 2 and 3 show the relationship between RPM, rheostat setting, and output reduction. FIG. 2 is a graph showing the output magnitude reduction vs rheostat setting for 2400 and 2900 RPM. FIG. 3 is a graph showing the output magnitude reduction vs RPM for 50–70% rheostat setting and for 70–100% rheostat setting.

The example given herein is merely exemplary, and other reduction schemes may be used, such as having the reduction vary in discrete steps with decreasing RPM, or as other than a linear function. Another alternative includes varying the reduction continuously as the rheostat setting increases. Generally, any reduction scheme that adequately balances the competing interests of reducing power to avoid engine stalls while maintain power to maintain a quality arc is acceptable.

Figure 4:
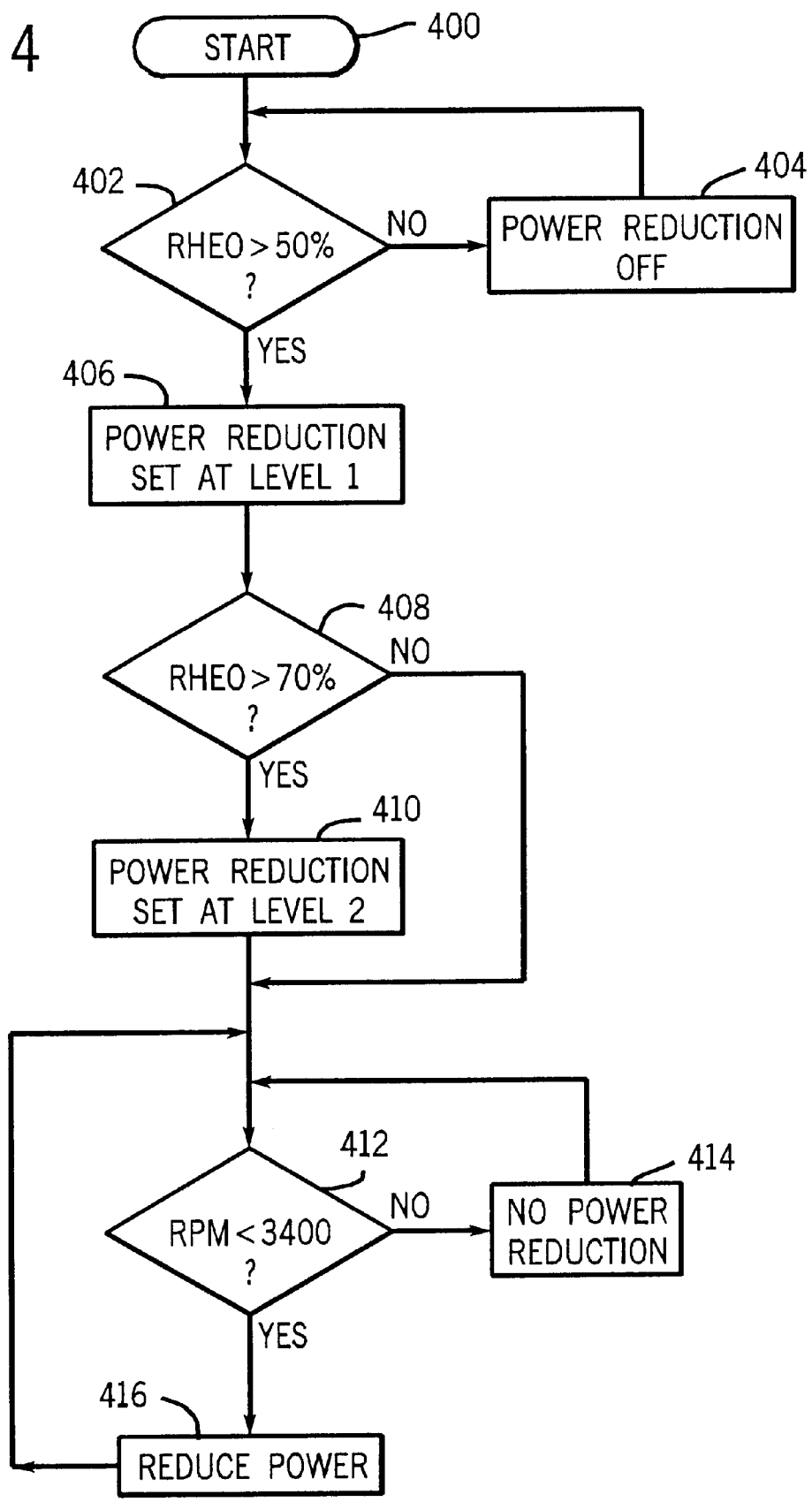
FIG. 4 is a flow chart implementing the present invention.

FIG. 4 is a flow chart showing one implementation of the present invention. The process begins at step 400, and at step 402 it is determined if the rheostat setting is greater than 50 percent. If the rheostat setting is not greater than 50 percent then the RPM circuit is off (step 404).

If the rheostat setting is greater than 50 percent than the RPM circuit is set at level one reduction (ten percent in the preferred embodiment) at step 406. Next, at step 408 it is determined if the rheostat setting is greater than 70 percent. If the rheostat setting is not greater than 70 percent then the RPM circuit is left at level one. However, if the rheostat setting is greater than 70 percent, than the RPM circuit is set to level two (40 percent in the preferred embodiment), at step 410.

It is determined if the RPM of the engine is less than 3400 at step 412. If the RPM of the engine is not less than 3400 then no modification of the field current is provided (step 414).

However, if the RPM is less than 3400, then the field current is reduced, preferably proportionally to the difference between 3400 and the RPM as set forth above, at step 416. The process continues to repeat the RPM check until the rheostat setting is changed. In an alternative embodiment the output is reduced for a finite period of time, such as 2 or 3 seconds.

This process may be implemented using analog circuitry, as described below, or using digital circuitry, such as a microprocessor or a DSP. Additionally, one skilled in the art will readily recognize that other flow charts or programs may be easily used to implement this invention.

Figure 5:
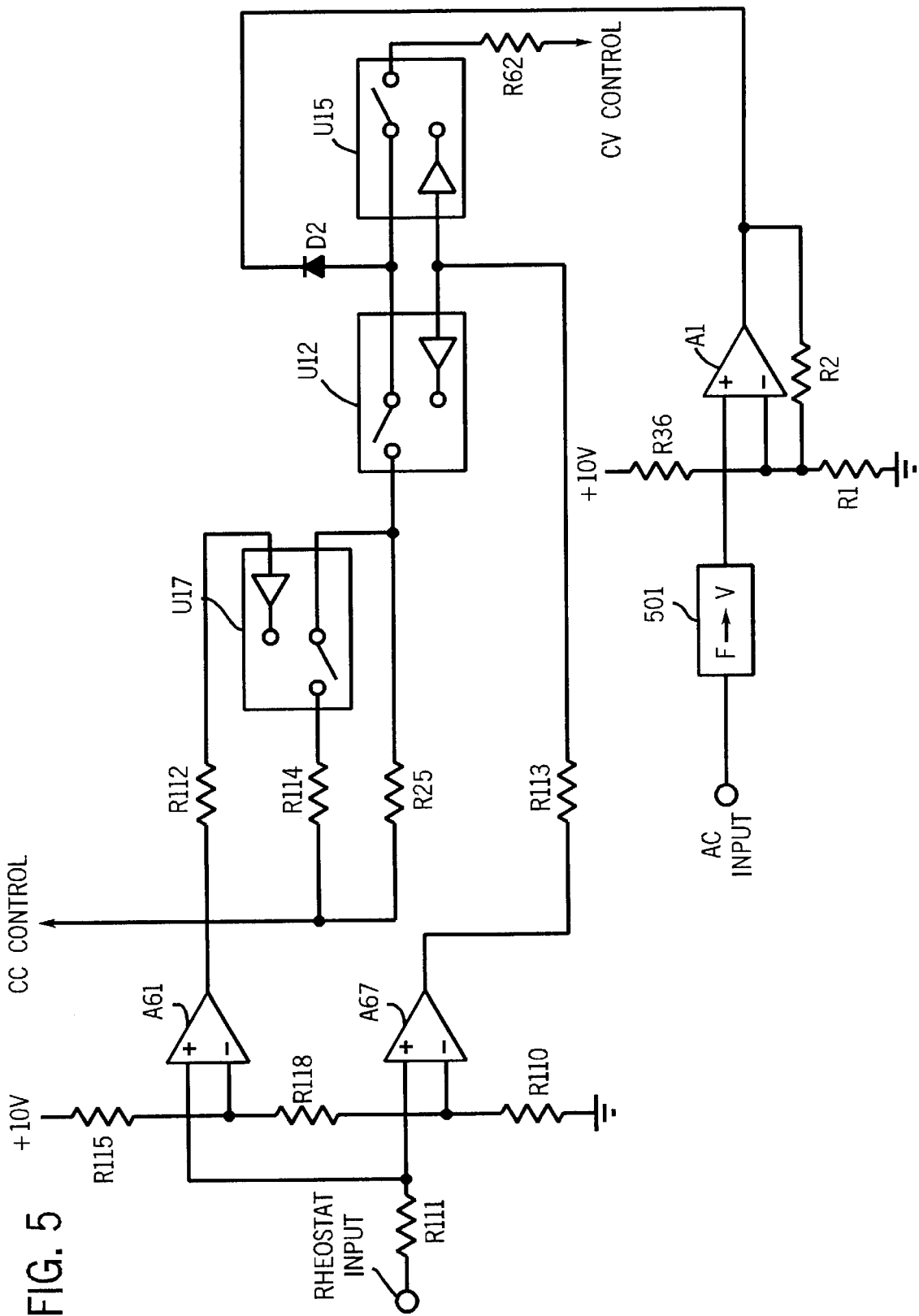
FIG. 5 is a circuit diagram of a power reduction circuit in accordance with the present invention.

A circuit which may be used to implement the power reduction circuit are shown in FIG. 5. The power reduction circuit receives a signal from the generator whose frequency is indicative of the speed of the engine. A frequency to voltage converter converts that frequency to a voltage. Additionally, the power reduction circuit receives the rheostat input (user selected magnitude) as an input. Generally, the power reduction circuit uses these inputs and compares them to predetermined values, and opens or closes switches which decrease the constant current (CC) and/or constant voltage (CV) control commands.

The power reduction circuit receives the AC input (which has the same frequency as the engine RPM) and provides it to frequency to voltage converter 501. Frequency to voltage converter 501 may be of a conventional design, and preferably includes an integrated circuit and associated circuitry. Frequency to voltage converter 501 provides an output voltage having a magnitude responsive to the input frequency, and thus indicative of the frequency of engine speed to or engine RPM.

The frequency voltage is provided to an op amp A1, which is configured to provide an output based on the difference between the frequency voltage and a voltage provided by a voltage divider. The voltage divider includes a resistor R36 (3.92 K ohms) and a resistor R1 (5.62 K ohms), and a 10 volt voltage source. The voltage divider is configured so that the output begins to be negative when the frequency of the engine drops below 3400 RPM. The magnitude of the output of op amp A1 is proportional to the difference between 3400 RPM and the actual RPM.

When the frequency falls below 3400 RPM, op amp A1 draws current through a diode D2 that reduces the CC and CV control commands. When the frequency is above 3400 RPM, then the output of op amp A1 is positive, and diode D2 blocks the output of op amp A1, effectively turning off the effect of the power reduction circuit.

The setting of the rheostat (user selected magnitude) is a 0–10 volt source and determines the level of power reduction. The rheostat setting is provided through a resistor R111 (100 K ohms) to the non-inverting inputs of a pair of op amps A61 and A67, both of which are configured as comparators. A voltage divider, including a 10 volt voltage source, a resistor R115 (6.19 K ohms), a resistor R118 (4.32 K Holmes) and a resistor R110 (10 K ohms), provides the inverting inputs to op amps a 61 and a 67.

The non-inverting input to op amp A67, as provided by the voltage divider, is 5 volts, which corresponds to a rheostat setting of 50 percent. When the rheostat setting exceeds 50 percent, the output of op amp A67 goes positive, and through a resistor R113 (4.75 K ohms) turns on or closes a pair of switches U12 and U115.

When switch U115 is closed the CV controller is reduced by current being drawn through resistor R62 (13 K ohms) and diode D2 by op amp A1. Also, when switch U12 is closed the CC control is reduced by current drawn through a resistor R25 (2.74 M ohms) and diode D2 by op amp A1. Thus, when the rheostat input exceeds 50 percent, and the frequency drops below 3400 RPM, the control commands are reduced by an amount proportional to the difference between 3400 and the RPM.

The non-inverting input to op amp A61, as provided by the voltage divider, is 7 volts, which corresponds to a rheostat setting of 70 percent. When the rheostat setting exceeds 70 percent, the output of op amp A61 goes positive, and through a resistor R112 (4.75 K ohms) turns on or closes a switch U17. When switch U17 is closed the CC control is further reduced by current drawn through a resistor R114 (619 K ohms) and diode D2 by op amp A1. Thus, when the rheostat input exceeds 70 percent, and the frequency drops below 3400 RPM, the CC control command is further reduced by an amount proportional to the difference between 3400 and the RPM.

Figure 6:
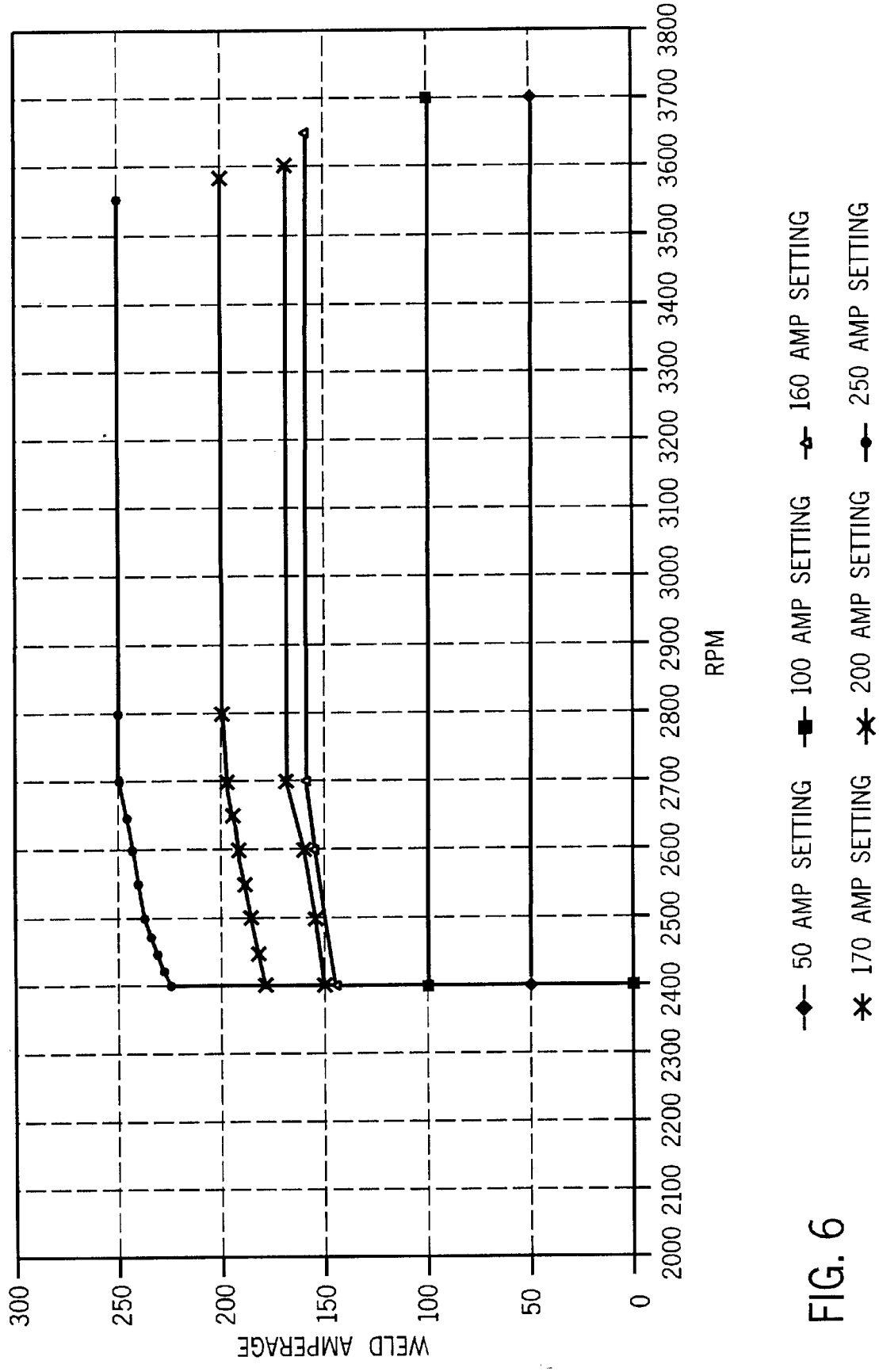
FIG. 6 is a graph showing weld output vs RPM.

FIG. 6 is a graph showing welding output (amperage) for different amp settings (rheostat or user settings) vs RPM for a welding power supply implementing the present invention. It may be seen that the output current drops as the RPM drops for rheostat settings greater than 145 amps (which is a 50% setting).

The values for components were chosen to give the preferred power reduction. Obviously, other values or other circuit designs could be used to implement the power reduction circuit. Alternatives include more or less feedback and general control circuitry as part of the power reduction circuit, circuitry to provide a continuous (i.e. not discrete steps) adjustment of the reduced power in response to the rheostat setting, circuitry to provide a stepped (i.e. not continuous) adjustment of the reduced power in response to the RPM, use of digital circuitry, use of a microprocessor or a DSP, providing the output of the power reduction circuit to control an inverter, etc.

Numerous modifications may be made to the present invention which still fall within the intended scope hereof. It should be apparent that there has been provided in accordance with the present invention a method and apparatus for adjusting the output of welding power supply in response to stall conditions that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. An engine/generator driven welding power supply for providing a welding output comprising:

an engine;

a generator, mechanically linked to the engine, and having a generator output;

a welding power supply having an input connected to the generator output, and having a welding output, and providing a welding power on the welding output;

a controller having an RPM input connected to receive an RPM signal indicative of the engine RPM, and further having a user selected magnitude input, and wherein the controller includes an output reduction circuit having as an input the RPM signal, wherein the output reduction circuit reduces a magnitude of the welding power by a variable amount in the event the engine is likely to stall so as to reduce the likelihood of a stall, but maintain sufficient power for a welding arc.

2. The apparatus of claim 1, wherein the generator includes a field winding having a field current, and the magnitude of the welding power is responsive to the field current, and wherein the magnitude of the field current is responsive to the output reduction circuit.

3. The apparatus of claim 2 wherein the output reduction circuit includes an RPM threshold circuit and the field current is reduced by an amount responsive to the engine RPM in the event that the engine RPM is less than an RPM threshold.

4. The apparatus of claim 3 wherein the output reduction circuit includes a difference circuit and the field current is reduced by an amount responsive to the difference between the RPM threshold and the engine RPM.

5. The apparatus of claim 3 wherein the output reduction circuit includes a difference circuit and the field current is reduced in steps responsive to the difference between the RPM threshold and the engine RPM.

6. The apparatus of claim 2 wherein the output reduction circuit includes a threshold circuit and the field current is reduced by an amount responsive to the user selected magnitude setting in the event that the user selected magnitude setting is greater than a threshold.

7. The apparatus of claim 6 wherein the output reduction circuit includes a difference circuit and the field current is reduced by an amount responsive to the difference between the threshold and the user selected magnitude setting.

8. The apparatus of claim 6 wherein the output reduction circuit includes a difference circuit and the field current is reduced in steps responsive to the difference between the threshold and the user selected magnitude setting.

9. An engine/generator driven welding power supply for providing a welding output comprising:
   a user selectable magnitude input;
   an engine;
   a generator, mechanically linked to the engine, and having a generator output;
   a welding power supply having an input connected to the generator output, and having a welding output, and providing a welding power on the welding output;
   a feedback circuit with an RPM feedback output indicative of engine RPM;
   a controller having an RPM input connected to the RPM feedback output and having a magnitude input connected to the user selectable magnitude input, and wherein the controller includes an output reduction circuit having as an input the RPM signal and the user selectable magnitude input, wherein the output reduction circuit reduces a magnitude of the welding power by an amount responsive to the engine speed in the event that the engine RPM is less than an RPM threshold.

10. The apparatus of claim 9, wherein the generator includes a field winding having a field current, and the magnitude of the welding power is responsive to the field current, and wherein the magnitude of the field current is responsive to the output reduction circuit.

11. The apparatus of claim 10 wherein the output reduction circuit includes a difference circuit and the field current is reduced by an amount responsive to the difference between the RPM threshold and the engine RPM.

12. The apparatus of claim 10 wherein the output reduction circuit includes a difference circuit and the field current is reduced by an amount proportional to the difference between the RPM threshold and the engine RPM.

13. The apparatus of claim 12 wherein the output reduction circuit includes a threshold circuit and the field current is reduced by an amount responsive to the magnitude input in the event that the magnitude input is greater than a threshold.

14. An engine/generator driven welding power supply for providing a welding output comprising:
   a user selectable magnitude input;
   an engine;
   a generator, mechanically linked to the engine, and having a generator output;
   a welding power supply having an input connected to the generator output, and having a welding output, and providing a welding power on the welding output;
   a feedback circuit with an RPM feedback output indicative of engine RPM;
   a controller having an RPM input connected to the RPM feedback output and having a magnitude input connected to the user selectable magnitude input, and wherein the controller includes an output reduction circuit having as an input the RPM signal, wherein the output reduction circuit reduces a magnitude of the welding power by an amount responsive to the magnitude input in the event that the magnitude input is greater than a threshold.

15. The apparatus of claim 14, wherein the generator includes a field winding having a field current, and the magnitude of the welding power is responsive to the field current, and wherein the magnitude of the field current is responsive to the output reduction circuit.

16. The apparatus of claim 15 wherein the output reduction circuit includes a difference circuit and the field current is reduced by an amount responsive to the difference between the user selected magnitude setting and the threshold in the event that user selected magnitude setting is greater than the a threshold.

17. The apparatus of claim 15 wherein the output reduction circuit includes a difference circuit and the field current is reduced in steps responsive to the difference between the threshold and the user selected magnitude setting.

18. The apparatus of claim 17 wherein the output reduction circuit includes an RPM threshold circuit and the field current is reduced by an amount responsive to the engine RPM in the event that the engine RPM is less than an RPM threshold.

19. A method of controlling an engine/generator driven welding power supply comprising:
   determining a user selected magnitude setting;
   determining a speed of the engine;
   providing a welding output responsive to the user selected magnitude setting;
   reducing a magnitude of the welding output by a variable amount in the event the engine is likely to stall so as to reduce the likelihood of a stall, but maintain sufficient power for a welding arc.

20. The method of claim 19, wherein reducing the magnitude of the welding output further comprises reducing the magnitude of a field current.

21. The method of claim 19, wherein reducing the magnitude of the welding output further comprises reducing the welding output by an amount responsive to the engine speed in the event that the engine speed is less than a speed threshold.

22. The method of claim 21, wherein reducing the magnitude of the welding output further comprises reducing the welding output by an amount responsive to the difference between the speed threshold and the engine speed.

23. The method of claim 22, wherein reducing the magnitude of the welding output further comprises reducing the welding output by an amount proportional to the difference between the speed threshold and the engine speed.

24. The method of claim 22, wherein reducing the magnitude of the welding output further comprises reducing the welding output in steps responsive to the difference between the speed threshold and the engine speed.

25. The method of claim 22, wherein reducing the magnitude of the welding output further comprises reducing the welding output by an amount responsive to the user selected magnitude setting in the event that the user selected magnitude setting is greater than a threshold.

26. The method of claim 25, wherein reducing the magnitude of the welding output further comprises reducing the welding output by an amount responsive to the difference between the threshold and the user selected magnitude setting.

27. The method of claim 26, wherein reducing the magnitude of the welding output further comprises reducing the welding output in steps responsive to the difference between the threshold and the user selected magnitude setting.

28. The method of claim 19, wherein reducing the magnitude of the welding output further comprises reducing a load magnitude command signal.

29. A method of controlling an engine/generator driven welding power supply comprising:
   determining a user selected magnitude setting;
   determining a speed of the engine;

providing a welding output responsive to the user selected magnitude setting;

reducing a magnitude of the welding output by an amount responsive to the engine RPM in the event that the engine RPM is less than an RPM threshold and the user selected magnitude setting is greater than a threshold.

30. The method of claim 29, wherein reducing the magnitude of the welding output further comprises reducing the magnitude of a field current.

31. The method of claim 29, wherein reducing the magnitude of the welding output further comprises reducing the welding output by an amount responsive to the difference between the RPM threshold and the engine speed.

32. The method of claim 31, wherein reducing the magnitude of the welding output further comprises reducing the welding output by an amount responsive to the user selected magnitude.

33. The method of claim 32, wherein reducing the magnitude of the welding output further comprises reducing the welding output in steps responsive to the difference between the threshold and the user selected magnitude setting.

34. The method of claim 29, wherein reducing the magnitude of the welding output further comprises reducing a load magnitude command signal.

35. A method of controlling an engine/generator driven welding power supply comprising:

determining a user selected magnitude setting;

determining a speed of the engine;

providing a welding output responsive to the user selected magnitude setting;

reducing the magnitude of the welding output by an amount responsive to the user selected magnitude setting in the event that the user selected magnitude setting is greater than a threshold.

36. The method of claim 35, wherein reducing the magnitude of the welding output further comprises reducing the magnitude of a field current.

37. The method of claim 36, wherein reducing the magnitude of the welding output further comprises reducing the welding output by an amount responsive to the difference between the threshold and the user selected magnitude setting.

38. The method of claim 37, wherein reducing the magnitude of the welding output further comprises reducing the welding output in steps responsive to the difference between the threshold and the user selected magnitude setting.

39. The method of claim 35, wherein reducing the magnitude of the welding output further comprises reducing a load magnitude command signal.

40. A generator driven welding power supply for providing a welding output from an engine drive comprising:

means for determining a user selected magnitude setting;

means for determining a speed of the engine;

means for providing a welding output responsive to the user selected magnitude setting;

means for reducing a magnitude of the welding output by a variable amount in the event the engine is likely to stall so as to reduce the likelihood of a stall, but maintain sufficient power for a welding arc.

41. The apparatus of claim 40, wherein the means for reducing the magnitude of the welding output further comprises means for reducing the magnitude of a field current.

42. The apparatus of claim 40, wherein the means for reducing the magnitude of the welding output further comprises means for reducing the welding output by an amount responsive to the engine speed in the event that the engine speed is less than a speed threshold.

43. The apparatus of claim 42, wherein the means for reducing the magnitude of the welding output further comprises means for reducing the welding output by an amount responsive to the difference between the speed threshold and the engine speed.

44. The apparatus of claim 40, wherein the means for reducing the magnitude of the welding output further comprises means for by an amount responsive to the user selected magnitude setting in the event that the user selected magnitude setting is greater than a threshold.

45. A generator driven welding power supply for providing a welding output from an engine drive comprising:

means for determining a user selected magnitude setting;

means for determining a speed of the engine;

means for providing a welding output responsive to the user selected magnitude setting;

means for reducing a magnitude of the welding output by an amount responsive to the engine speed in the event that the engine speed is less than a speed threshold and the user selected magnitude setting is greater than a threshold.

46. The apparatus of claim 45, wherein the means for reducing the magnitude of the welding output further comprises means for reducing the magnitude of a field current.

47. The apparatus of claim 45, wherein the means for reducing the magnitude of the welding output further comprises means for reducing the welding output by an amount responsive to the difference between the RPM threshold and the engine speed.

48. The apparatus of claim 45, wherein the means for reducing the magnitude of the welding output further comprises means for reducing the welding output by an amount responsive to the user selected magnitude setting.

49. A generator driven welding power supply for providing a welding output from an engine drive comprising:

means for determining a user selected magnitude setting;

means for determining a speed of the engine;

means for providing a welding output responsive to the user selected magnitude setting;

means for reducing the magnitude of the welding output by an amount responsive to the user selected magnitude setting in the event that the user selected magnitude setting is greater than a threshold.

* * * * *